United States Patent
Payne et al.

(10) Patent No.: US 11,230,197 B2
(45) Date of Patent: Jan. 25, 2022

(54) METHODS AND SYSTEMS FOR INTEGRATING A HUB MOTOR WITH A VEHICLE

(71) Applicant: Toyota Motor Engineering & Manufacturing North America, Inc., Plano, TX (US)

(72) Inventors: Joshua D. Payne, Ann Arbor, MI (US); Shannon Alicia Wrobel, Ann Arbor, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 278 days.

(21) Appl. No.: 16/533,959

(22) Filed: Aug. 7, 2019

(65) Prior Publication Data

US 2021/0039505 A1 Feb. 11, 2021

(51) Int. Cl.
*B60L 15/42* (2006.01)

(52) U.S. Cl.
CPC ........... *B60L 15/42* (2013.01); *B60L 2220/44* (2013.01); *B60L 2240/10* (2013.01); *B60L 2260/26* (2013.01)

(58) Field of Classification Search
CPC .. B60L 15/42; B60L 2220/44; B60L 2240/10; B60L 2260/26; Y02T 90/16
See application file for complete search history.

(56) References Cited

U.S. PATENT DOCUMENTS

| | | | |
|---|---|---|---|
| 7,092,803 B2 * | 8/2006 | Kapolka | G06Q 10/08 340/3.1 |
| 7,421,321 B2 | 9/2008 | Breed et al. | |
| 8,140,208 B2 | 3/2012 | Tofukuji | |

(Continued)

FOREIGN PATENT DOCUMENTS

| WO | 2007136275 A2 | 11/2007 |
|---|---|---|
| WO | 2008060318 A2 | 5/2008 |

OTHER PUBLICATIONS

Montero et al., "Modeling and Torque Control for a 4-Wheel-Drive Electric Vehicle," Department of Systems Engineering and Automatic Control, Jun. 2015, pp. 1-7.

*Primary Examiner* — Behrang Badii
*Assistant Examiner* — Daniel L Greene
(74) *Attorney, Agent, or Firm* — Christopher G. Darrow; Darrow Mustafa PC

(57) ABSTRACT

Systems and methods described herein concern integrating a hub motor with a vehicle. One embodiment establishes a communication link between the hub motor and an electronic control unit (ECU) of the vehicle; transmits, from the hub motor to the ECU via the communication link, an identity of the hub motor; transmits, from the ECU to the hub motor via the communication link, an identity of the ECU and information regarding functionality supported by the ECU; reports, from the hub motor to the ECU via the communication link based at least in part on the identity of the ECU and the information regarding the functionality supported by the ECU, calibration data for the hub motor (Continued)

and information regarding the functionality supported by the hub motor; and adjusts, at the ECU, one or more characteristics of the vehicle in accordance with the calibration data and the functionality supported by the hub motor.

17 Claims, 3 Drawing Sheets

(56) References Cited

U.S. PATENT DOCUMENTS

| | | | |
|---|---|---|---|
| 8,725,335 B2* | 5/2014 | Tolkacz | B60W 10/06 |
| | | | 701/22 |
| 9,056,556 B1 | 6/2015 | Hyde et al. | |
| 9,079,505 B1 | 7/2015 | Hyde et al. | |
| 9,254,877 B2 | 2/2016 | Ferren et al. | |
| 2003/0230443 A1* | 12/2003 | Cramer | B60G 3/20 |
| | | | 180/65.51 |
| 2010/0256874 A1* | 10/2010 | Carresjo | G01M 17/013 |
| | | | 701/48 |
| 2010/0274441 A1* | 10/2010 | Carresjo | B60C 23/0479 |
| | | | 701/31.4 |
| 2011/0192666 A1 | 8/2011 | Schmid et al. | |
| 2011/0320088 A1 | 12/2011 | Eom et al. | |
| 2015/0075887 A1* | 3/2015 | Song | B60L 50/20 |
| | | | 180/167 |
| 2015/0131197 A1 | 5/2015 | Morris, III et al. | |
| 2017/0225564 A1 | 8/2017 | Christensen et al. | |
| 2018/0022340 A1 | 1/2018 | Hill et al. | |
| 2020/0316987 A1* | 10/2020 | Hsu | B60B 33/0002 |
| 2020/0324813 A1* | 10/2020 | Hsu | B62J 25/06 |
| 2020/0354018 A1* | 11/2020 | Hiramatsu | B62K 5/05 |

\* cited by examiner

METHODS AND SYSTEMS FOR INTEGRATING A HUB MOTOR WITH A VEHICLE

TECHNICAL FIELD

The subject matter described herein relates in general to vehicles and, more specifically, to systems and methods for integrating a hub motor with a vehicle.

BACKGROUND

To propel a vehicle, an alternative to a traditional drivetrain and differential is installing hub motors directly on the wheels. In some cases, the hub motors are designed to be removable and re-installable so that the vehicle can be configured in different ways according to the owner's needs. For example, during the week a vehicle owner might operate a hybrid or electric vehicle in a standard two-wheel-drive configuration for daily commutes to and from work. On the weekend, the owner might reconfigure the vehicle as an all-wheel-drive vehicle by adding two modular hub motors to one of the axles. Such vehicle reconfigurations can require the vehicle's electronic control unit (ECU) to store calibration information for a variety of different hub motors, increasing the development burden for a vehicle OEM.

SUMMARY

An example of a method of integrating a hub motor with a vehicle is presented herein. The method comprises establishing a communication link between the hub motor and an electronic control unit (ECU) of the vehicle. The method also includes transmitting, from the hub motor to the ECU via the communication link, an identity of the hub motor. The method also includes transmitting, from the ECU to the hub motor via the communication link, an identity of the ECU and information regarding functionality supported by the ECU. The method also includes reporting, from the hub motor to the ECU via the communication link based at least in part on the identity of the ECU and the information regarding the functionality supported by the ECU, calibration data for the hub motor and functionality supported by the hub motor. The method also includes adjusting, at the ECU, one or more characteristics of the vehicle in accordance with the calibration data and the functionality supported by the hub motor.

Another embodiment is a hub motor, comprising one or more processors and a memory communicably coupled to the one or more processors. The memory stores an identification module including instructions that when executed by the one or more processors cause the one or more processors to identify the hub motor to an electronic control unit (ECU) of a vehicle in which the hub motor is installed. The identification module also includes instructions to receive, from the ECU, an identity of the ECU and information regarding functionality supported by the ECU. The memory also stores a reporting module including instructions that when executed by the one or more processors cause the one or more processors to report to the ECU, based at least in part on the identity of the ECU and the information regarding the functionality supported by the ECU, calibration data for the hub motor and functionality supported by the hub motor to enable the ECU to adjust one or more characteristics of the vehicle in accordance with the calibration data and the functionality supported by the hub motor.

Another embodiment is an electronic control unit (ECU) for a vehicle, comprising one or more processors and a memory communicably coupled to the one or more processors. The memory stores a component identification module including instructions that when executed by the one or more processors cause the one or more processors to receive, from a hub motor installed in the vehicle, an identity of the hub motor. The component identification module also includes instructions to transmit, to the hub motor, an identity of the ECU and information regarding functionality supported by the ECU. The memory also stores a system configuration module including instructions that when executed by the one or more processors cause the one or more processors to receive from the hub motor, based at least in part on the identity of the ECU and the information regarding the functionality supported by the ECU, calibration data for the hub motor and functionality supported by the hub motor. The system configuration module also includes instructions to adjust one or more characteristics of the vehicle in accordance with the calibration data and the functionality supported by the hub motor.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

The embodiments described herein shift the development burden from vehicle original equipment manufacturers (OEMs) to the developers and manufacturers of hub motors by storing calibration information (e.g., drive-force maps) for various vehicles and vehicle configurations in an embedded electronic control unit (ECU) of the hub motors themselves. When a hub motor is installed in a vehicle, the hub motor's ECU and the vehicle's system ECU establish a communication link with each other. The hub motor transmits its identity to the system ECU, and the system ECU transmits, to the hub motor, its identity and information regarding the functionality supported by the system ECU. In accordance with the identity and supported functionality of the system ECU, the hub motor reports, to the system ECU, calibration data for the hub motor and information regarding the functionality supported by the hub motor. The system ECU then adjusts one or more characteristics of the vehicle in accordance with the calibration data and the information regarding the functionality supported by the hub motor. Such adjustments can account for interdependencies between the hub motor and vehicle in which it is installed. In this way, the hub motor is successfully integrated with the vehicle. In some embodiments, the hub motor stores calibration data (e.g., drive-force maps) for a plurality of different vehicle types and configurations.

Figure 1:
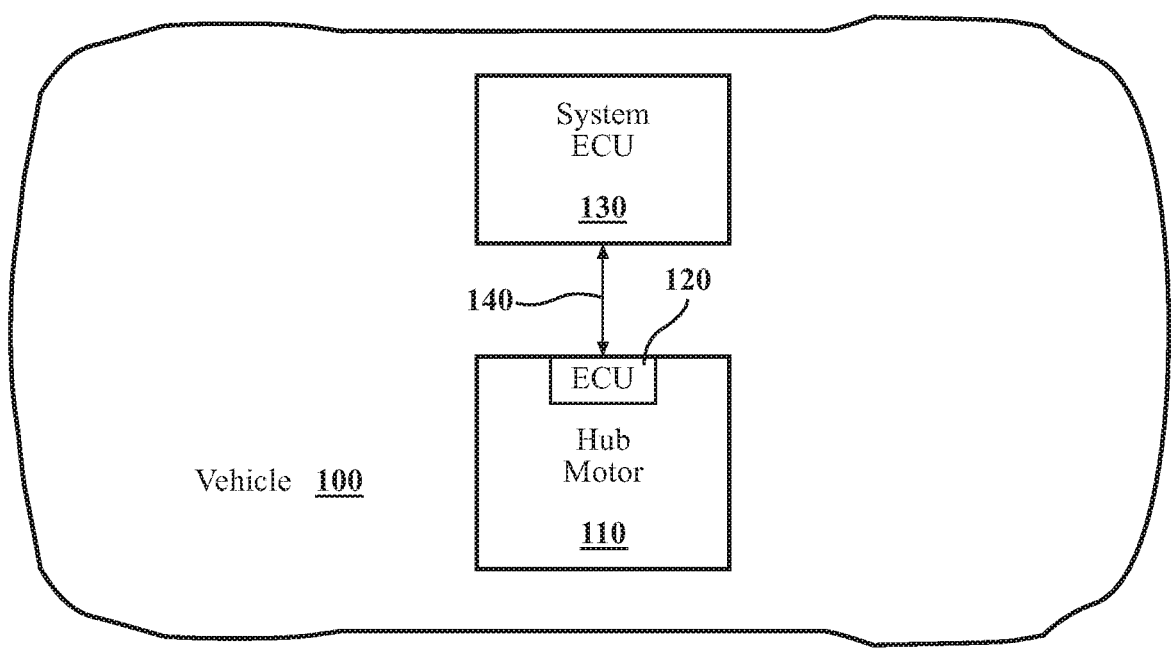
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport that can be powered by electricity from a battery, an internal combustion engine (ICE), or both in tandem. Such vehicles are commonly referred to as "hybrid electric vehicles" (HEVs), and those that can be recharged by plugging their battery into an electrical outlet are sometimes referred to as "plug-in hybrid electric vehicles" (PHEVs). In this description, the various types of hybrid vehicles will be referred to as simply "vehicles." In one or more implementations, the vehicle 100 is an automobile. While arrangements will be described herein with respect to automobiles, it will be understood that embodiments are not limited to automobiles. In some implementations, the vehicle 100 may be any other form of motorized transport. In various embodiments, hub motors can be added to the wheels of at least one non-motive axle of vehicle 100. In some embodiments, the hub motors can be removed and reinstalled by the end user or owner of the vehicle as needed (e.g., to reconfigure the vehicle as all-wheel-drive for bad weather or weekend recreation). In other embodiments, hub motors can be transferred from one vehicle to another.

The vehicle 100 also includes various elements. It will be understood that vehicle 100 can have other elements in addition to those shown in FIG. 1. Some of the possible elements of vehicle 100 pertaining to the embodiments described herein are shown in FIG. 1 and will be described in greater detail in connection with subsequent figures. It will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those skilled in the art, however, will understand that the embodiments described herein may be practiced using various combinations of these elements.

The vehicle 100 includes an installed (physically attached) hub motor 110. In this embodiment, hub motor 110 includes its own embedded ECU, hub-motor ECU 120. Hub-motor ECU 120 permits hub motor 110 to communicate with system ECU 130 of vehicle 100 via a communication link 140. In some embodiments, communication link 140 can include a Controller Area Network (CAN) bus of vehicle 100 (not shown in FIG. 1) or some other kind of wired communication path (e.g., Ethernet link, optical-fiber link, etc.). In other embodiments, communication link 140 includes a wireless communication link (e.g., Bluetooth or other short-range wireless link). In some embodiments, hub motor 110 includes an embedded radio-frequency identification (RFID) device that performs at least some of the communication functions between hub motor 110 and system ECU 130. For example, in one embodiment, when system ECU 130 detects or is otherwise informed that hub motor 110 has been installed, it polls the RFID device in hub motor 110 to obtain identity information (make, model, serial number, etc.) regarding hub motor 110.

Figure 2:
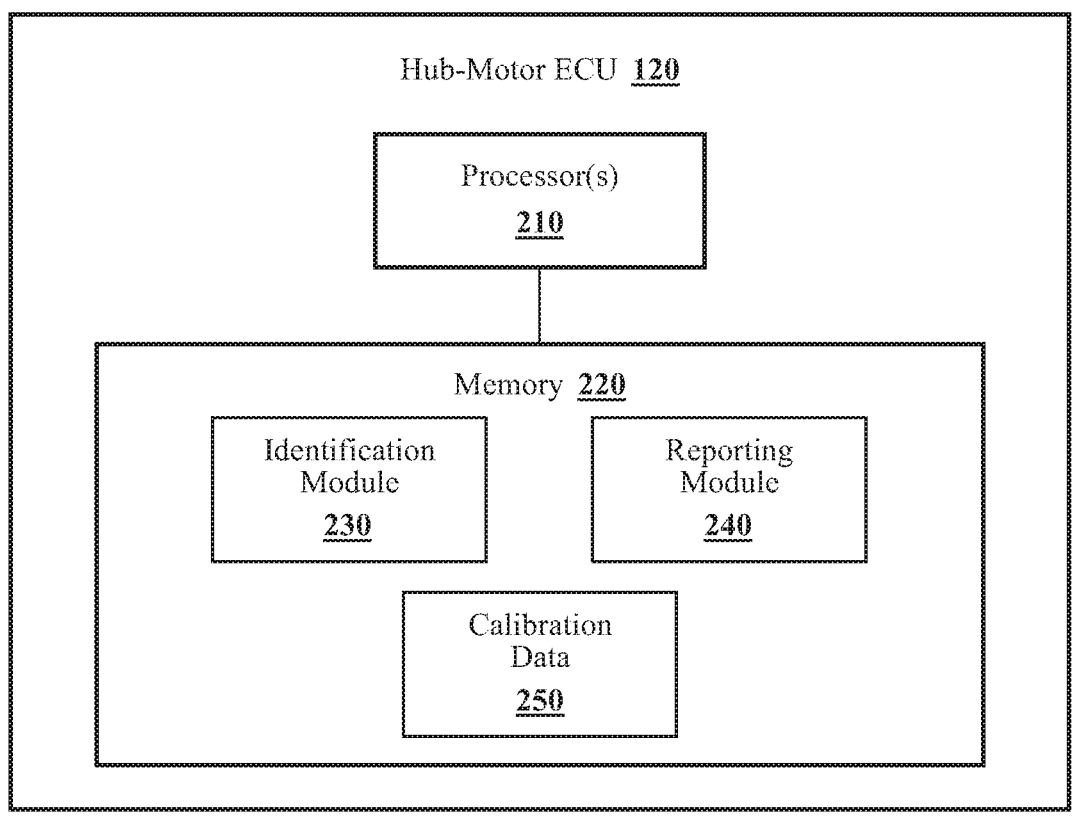
FIG. 2 illustrates one embodiment of a hub-motor electronic control unit (ECU) illustrated in FIG. 1.

With reference to FIG. 2, one embodiment of the hub-motor ECU 120 in FIG. 1 is further illustrated. Hub-motor ECU 120 includes one or more processors 210 and a memory 220 communicably coupled with the one or more processors 210. In this embodiment, memory 220 stores an identification module 230, a reporting module 240, and calibration data 250. The memory 220 is a random-access memory (RAM), read-only memory (ROM), flash memory, or other suitable memory for storing the modules 230 and 240 and calibration data 250. The modules 230 and 240 are, for example, computer-readable instructions that when executed by the one or more processors 210, cause the one or more processors 210 to perform the various functions disclosed herein. In some embodiments, the modules 230 and 240 and calibration data 250 can be updated as needed (e.g., memory 220 can be re-flashed or otherwise updated).

Hub-motor ECU 120 can store, in calibration data 250, calibration data such as drive-force maps (relationships between the applied torque and the resulting drive force to a wheel) corresponding to one or more vehicles and vehicle configurations in which hub motor 110 could potentially be installed. That is, hub-motor ECU 120 can store calibration data that a particular vehicle's system ECU 130 needs to ensure that vehicle 100 operates correctly with hub motor 110 installed on a wheel of vehicle 100. Calibration data 250 can also include, for example, component limitation thresholds, rate filters, other maps such as motor torque and power limit maps based on speed and temperature, and processing logic. In some embodiments, the processing logic includes functional relationships between particular inputs and output torque to support applications such as torque vectoring, in which toque is applied to the wheels at different rates to improve cornering performance. More specifically, a function called DriveForceMap( ), for example, can accept, as input, the percentage of depression of the vehicle's accelerator pedal, the current vehicle speed, and the accelerator pedal rate and output a corresponding torque value.

Identification module 230 generally includes instructions that cause the one or more processors 210 to identify the hub motor 110 (e.g., make, model, serial number, etc.) to the system ECU 130 of a vehicle 100 in which hub motor 110 is installed. That is, identification module 230 can transmit such information to system ECU 130 via communication link 140. Identification module 230 also includes instructions that cause the one or more processors 210 to receive, from system ECU 130, identity information regarding system ECU 130 (e.g., make, model, and model year of vehicle 100) and information regarding the functionality supported by system ECU 130 (and, ultimately, by vehicle 100). This information regarding the functionality supported by system ECU 130 could include, for example, the number of axles on vehicle 100 and which of those axles are motive and non-motive.

Reporting module 240 generally includes instructions that cause the one or more processors 210 to report, to system ECU 130, calibration data for the hub motor 110 and information regarding the functionality supported by hub motor 110. Reporting module 240 does so based, at least in part, on the received identity of system ECU 130 and the information regarding the functionality supported by system ECU 130. For example, reporting module 240 can report, to system ECU 130, the applicable calibration data (e.g., drive-force map and/or other calibration data) that corresponds to vehicle 100 and its supported functionality. The reported calibration data and information regarding the functionality supported by hub motor 110 enable system ECU 130 to adjust one or more operating characteristics of vehicle 100 accordingly so that hub motor 110 successfully integrates with vehicle 100. This is discussed further below.

As discussed above, in some embodiments, hub motor 110 is of a type that permits an end user or owner of hub motor 110 to remove and reinstall it as needed. In those embodiments, hub motor 110 is thus modular. In some cases, an end user or owner might wish to transfer one or more hub motors 110 from one vehicle to another. In some embodiments, the reported information regarding the functionality supported by hub motor 110 is based, at least in part, on operational performance data for the hub motor 110 that was gathered while the hub motor 110 was installed in a different vehicle from which it was transferred. In other words, in such an embodiment, hub motor 110 incorporates efficiency learning techniques that enable hub motor 110 to report its actual operating capabilities to system ECU 130.

Figure 3:
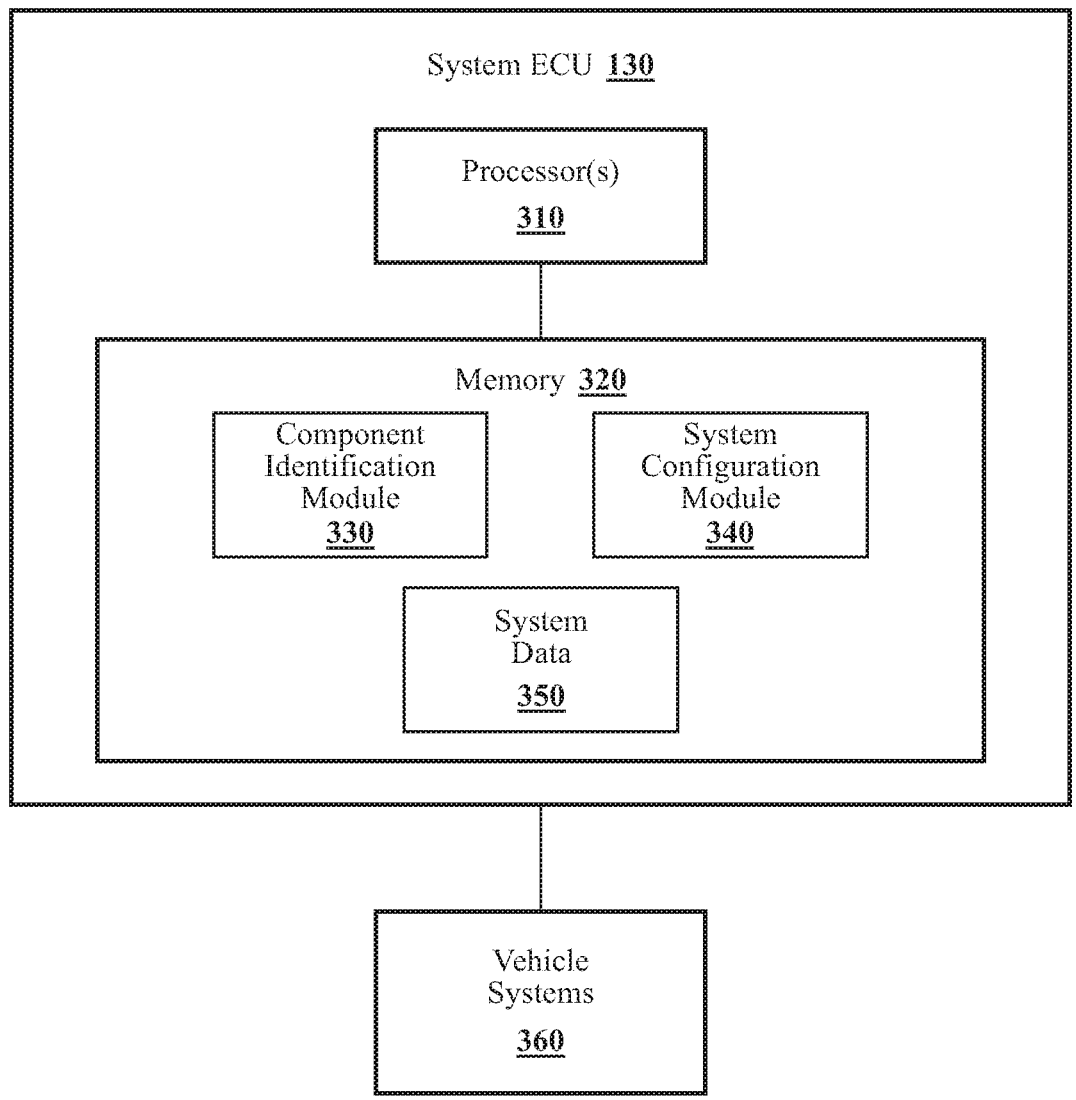
FIG. 3 illustrates one embodiment of a system electronic control unit (ECU) illustrated in FIG. 1.

With reference to FIG. 3, one embodiment of the system ECU 130 in FIG. 1 is further illustrated. System ECU 130 includes one or more processors 310 and a memory 320 communicably coupled with the one or more processors 310. In this embodiment, memory 320 stores a component identification module 330, a system configuration module 340, and system data 350. The memory 320 is a random-access memory (RAM), read-only memory (ROM), hard-disk drive, flash memory, or other suitable memory for storing the modules 330 and 340 and system data 350. The modules 330 and 340 are, for example, computer-readable instructions that when executed by the one or more processors 310, cause the one or more processors 310 to perform the various functions disclosed herein. System ECU 130 can store, in system data 350, various kinds of data used by component identification module 330 and system configuration module 340, including, in some embodiments, a current configuration of vehicle 100 (e.g., two-wheel drive, all-wheel-drive, etc.). System ECU 130 can update the stored current configuration of vehicle 100 as the configuration of vehicle 100 changes (e.g., as hub motors are installed or removed).

Component identification module 330 generally includes instructions that cause the one or more processors 310 to receive, from a hub motor 110 installed in vehicle 100, identifying information regarding the hub motor 110 (e.g., make, model, serial number, etc.). Component identification module 330 can also transmit, to the hub motor 110, identity information regarding system ECU 130 (e.g., make, model, and model year of vehicle 100) and information regarding the functionality supported by system ECU 130. As discussed above, the information regarding the functionality supported by system ECU 130 could include, for example, the number of axles on vehicle 100 and which of those axles are motive and non-motive.

System configuration module 340 generally includes instructions that cause the one or more processors 310 to receive, from hub motor 110, calibration data for hub motor 110 and information regarding the functionality supported by hub motor 110. As discussed above, hub-motor ECU 120 reports calibration data and information about its supported functionality based, at least in part, on the identity of system ECU 130 and the information regarding the functionality supported by system ECU 130 that hub-motor ECU 120 receives from system ECU 130.

System configuration module 340 also includes instructions that cause the one or more processors 310 to adjust one or more characteristics of vehicle 100 in accordance with the calibration data and the information regarding the functionality supported by hub motor 110. For example, in one embodiment, adjusting one or more characteristics of vehicle 100 can include updating the current vehicle configuration for vehicle 100 to all-wheel drive. This could apply when an end user, for example, installs a hub motor 110 on each of the rear wheels of a normally front-wheel-drive sedan. Updating the vehicle configuration to reflect all-wheel-drive, in combination with receipt and application of the calibration data and supported-functionality information from hub-motor ECU 120, enables system ECU 130 to make whatever further adjustments to the vehicle systems 360 of vehicle 100 are needed for successful integration of hub motor 110 with vehicle 100. Vehicle systems 360 can include, for example, a propulsion system and a transmission.

Figure 4:
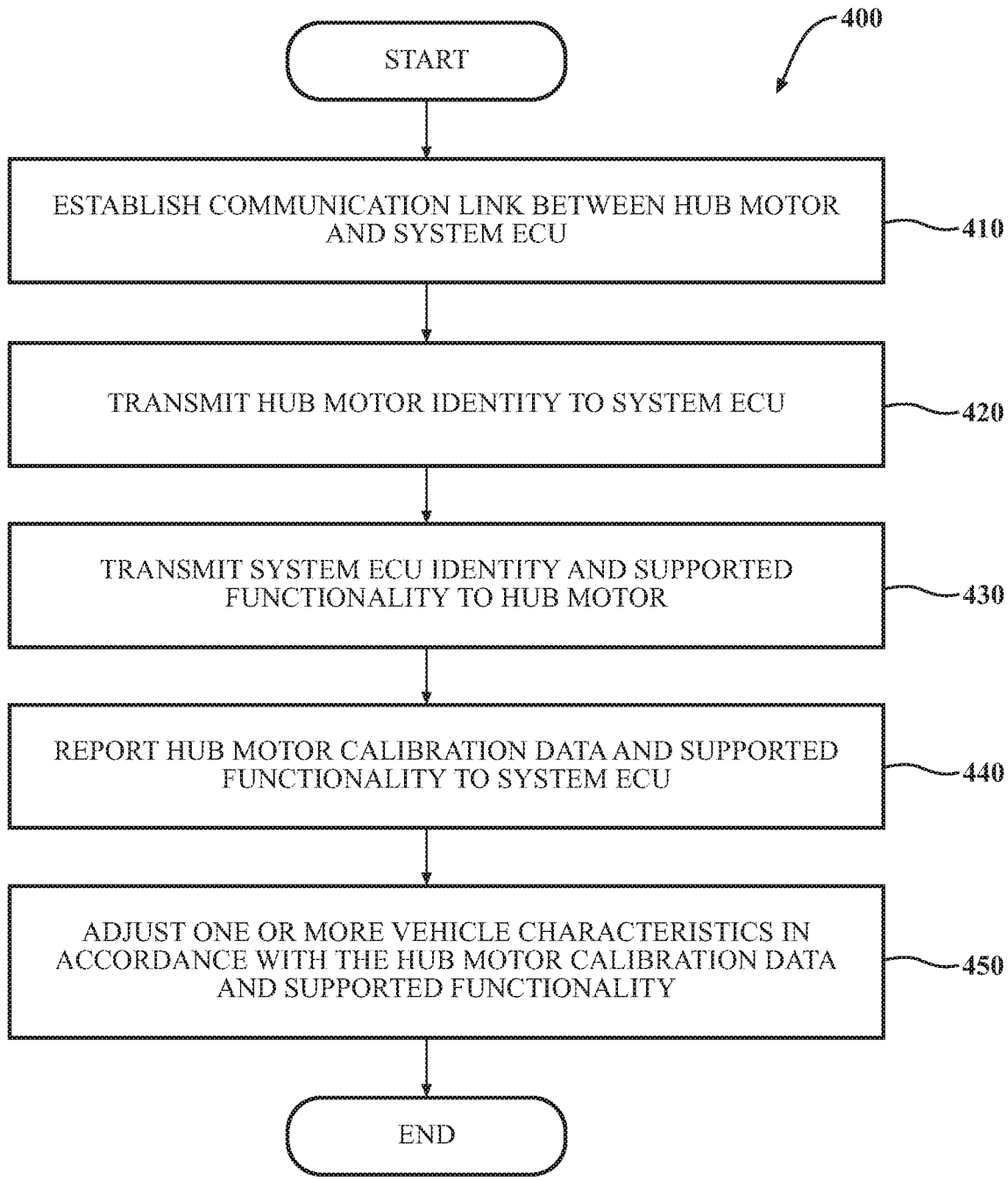
FIG. 4 is a flowchart of a method of integrating a hub motor with a vehicle, in accordance with an illustrative embodiment of the invention.

FIG. 4 is a flowchart of a method 400 of integrating a hub motor with a vehicle, in accordance with an illustrative embodiment of the invention. Method 400 will be discussed from the combined perspectives of hub-motor ECU 120 and system ECU 130 in FIGS. 2 and 3, respectively. While method 400 is discussed in combination with hub-motor ECU 120 and system ECU 130, it should be appreciated that method 400 is not limited to being implemented using hub-motor ECU 120 and system ECU 130, but hub-motor ECU 120 and system ECU 130, in combination, are instead one example of a system that may implement method 400.

At block 410, a communication link 140 is established between hub motor 110 (more specifically, hub-motor ECU 120) and system ECU 130. As discussed above, in some embodiments, communication link 140 can include a CAN bus of vehicle 100 or some other kind of wired communication path (e.g., Ethernet link, optical-fiber link, etc.). In other embodiments, communication link 140 includes a wireless communication link (e.g., Bluetooth or other short-range wireless link). As also discussed above, in some embodiments, hub motor 110 includes an embedded RFID device that performs at least some of the communication functions between hub motor 110 and system ECU 130. For example, in one embodiment, when system ECU 130 detects or is otherwise informed that hub motor 110 has been installed, it polls the RFID device in hub motor 110 to obtain identity information (make, model, serial number, etc.) regarding hub motor 110. Other information communicated between hub-motor ECU 120 and system ECU 130 is discussed below in connection with the other blocks of method 400.

At block 420, identification module 230 of hub-motor ECU 120 transmits identity information regarding hub motor 110 to component identification module 330 of system ECU 130. As discussed above, this information can include, for example, identification of the manufacturer, model, and/or serial number of the hub motor 110.

At block 430, component identification module 330 of system ECU 130 transmits, to identification module 230 of hub-motor ECU 120, information regarding the identity of system ECU 130 and the functionality that system ECU 130 supports. As discussed above, this information can include, for example, the make, model, and model year of vehicle 100. As also discussed above, the information regarding the functionality supported by system ECU 130 can include, for example, the number of axles on vehicle 100 and which of those axles are motive and non-motive.

At block 440, reporting module 240 of hub-motor ECU 120 reports, to system configuration module 340 of system ECU 130, calibration data for hub motor 110 and information regarding the functionality supported by hub motor 110. As discussed above, reporting module 240 does so based, at least in part, on the received identity of system ECU 130 and the information regarding the functionality supported by system ECU 130. For example, reporting module 240 can report, to system configuration module 340 of system ECU 130, the applicable calibration data (e.g., drive-force map and/or other calibration data) that is compatible with vehicle 100 and its supported functionality. In some embodiments, hub-motor ECU 120 stores, in calibration data 250, calibration data for a plurality of different vehicle types and configurations. This can simplify an OEM's design of system ECU 130.

At block 450, system configuration module 340 of system ECU 130 adjusts one or more operating characteristics of vehicle 100 in accordance with the calibration data and the information regarding the functionality supported by hub motor 110. As discussed above, in one embodiment, adjusting one or more characteristics of vehicle 100 can include updating the current vehicle configuration for vehicle 100 to all-wheel drive. This could apply when an end user, for example, installs a hub motor 110 on each of the rear wheels of a normally front-wheel-drive sedan. Updating the vehicle configuration to reflect all-wheel-drive, in combination with receipt and application of the calibration data and supported-functionality information from hub-motor ECU 120, enables system configuration module 340 of system ECU 130 to make whatever further adjustments to the vehicle systems 360 of vehicle 100 are needed for successful integration of hub motor 110 with vehicle 100.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

As used herein, "cause" or "causing" means to make, command, instruct, and/or enable an event or action to occur or at least be in a state where such event or action may occur, either in a direct or indirect manner.

Aspects herein can be embodied in other forms without departing from the spirit or essential attributes thereof. Accordingly, reference should be made to the following claims rather than to the foregoing specification, as indicating the scope hereof.

What is claimed is:

1. A method of integrating a hub motor with a vehicle, the method comprising:
    establishing a communication link between the hub motor and an electronic control unit (ECU) of the vehicle upon installation of the hub motor in the vehicle;
    transmitting, from the hub motor to the ECU via the communication link, an identity of the hub motor;
    transmitting, from the ECU to the hub motor via the communication link, an identity of the ECU and information regarding functionality supported by the ECU;
    determining at the hub motor, based on the identity of the ECU and the information regarding the functionality supported by the ECU, calibration data for the hub motor;
    reporting, from the hub motor to the ECU via the communication link, the calibration data for the hub motor and information regarding functionality supported by the hub motor; and
    adjusting, at the ECU, one or more characteristics of the vehicle in accordance with the calibration data and the information regarding the functionality supported by the hub motor.

2. The method of claim 1, wherein the calibration data includes at least one of a drive-force map, a component limitation threshold, a rate filter, a motor torque and power limit map, and processing logic.

3. The method of claim 1, wherein the hub motor stores calibration data for a plurality of different vehicle types and configurations.

4. The method of claim 1, wherein the communication link includes a wireless communication link.

5. The method of claim 1, wherein the communication link includes at least one of a Controller Area Network (CAN) bus of the vehicle, an Ethernet link, and an optical-fiber link.

6. The method of claim 1, wherein the adjusting includes updating a vehicle configuration to all-wheel drive.

7. The method of claim 1, wherein the reported information regarding the functionality supported by the hub motor is based, at least in part, on operational performance data for the hub motor gathered while the hub motor was installed in a different vehicle.

8. A hub motor, comprising:
    one or more processors; and
    a memory communicably coupled to the one or more processors and storing:
        an identification module including instructions that when executed by the one or more processors cause the one or more processors to:
            identify the hub motor to an electronic control unit (ECU) of a vehicle upon installation of the hub motor in the vehicle; and
            receive, from the ECU, an identity of the ECU and information regarding functionality supported by the ECU; and
        a reporting module including instructions that when executed by the one or more processors cause the one or more processors to:
            determine, based on the identity of the ECU and the information regarding the functionality supported by the ECU, calibration data for the hub motor; and
            report to the ECU the calibration data for the hub motor and information regarding functionality supported by the hub motor to enable the ECU to adjust one or more characteristics of the vehicle in accordance with the calibration data and the information regarding the functionality supported by the hub motor.

9. The hub motor of claim 8, wherein the calibration data includes at least one of a drive-force map, a component limitation threshold, a rate filter, a motor torque and power limit map, and processing logic.

10. The hub motor of claim 8, wherein the memory stores calibration data for a plurality of different vehicle types and configurations.

11. The hub motor of claim 8, wherein the identification module and the reporting module include instructions to communicate with the ECU via a communication link that includes a wireless communication link.

12. The hub motor of claim 8, wherein the identification module and the reporting module include instructions to communicate with the ECU via a communication link that includes at least one of a Controller Area Network (CAN) bus of the vehicle, an Ethernet link, and an optical-fiber link.

13. The hub motor of claim 8, wherein the reported information regarding the functionality supported by the hub motor is based, at least in part, on operational performance data for the hub motor gathered while the hub motor was installed in a different vehicle.

14. An electronic control unit (ECU) for a vehicle, the ECU comprising:
    one or more processors; and
    a memory communicably coupled to the one or more processors and storing:
        a component identification module including instructions that when executed by the one or more processors cause the one or more processors to:
            receive, from a hub motor upon installation of the hub motor in the vehicle, an identity of the hub motor; and
            transmit, to the hub motor, an identity of the ECU and information regarding functionality supported by the ECU; and
        a system configuration module including instructions that when executed by the one or more processors cause the one or more processors to:
            receive from the hub motor calibration data for the hub motor and information regarding functionality supported by the hub motor, wherein the hub motor determines the calibration data for the hub motor based on the identity of the ECU and the information regarding the functionality supported by the ECU; and adjust one or more characteristics of the vehicle in accordance with the calibration data and the information regarding the functionality supported by the hub motor.

15. The ECU of claim 14, wherein the component identification module and the system configuration module include instructions to communicate with the hub motor via a communication link that includes a wireless communication link.

16. The ECU of claim 14, wherein the component identification module and the system configuration module include instructions to communicate with the hub motor via a communication link that includes at least one of a Controller Area Network (CAN) bus of the vehicle, an Ethernet link, and an optical-fiber link.

17. The ECU of claim 14, wherein the instructions in the system configuration module to adjust one or more characteristics of the vehicle in accordance with the calibration data and the information regarding the functionality supported by the hub motor include updating a vehicle configuration to all-wheel drive.

\* \* \* \* \*